Reissued Mar. 18, 1930

Re. 17,624

UNITED STATES PATENT OFFICE

KARL SCHRÖTER, OF LICHTENBERG, NEAR BERLIN, GERMANY, ASSIGNOR TO GENERAL ELECTRIC COMPANY, A CORPORATION OF NEW YORK

HARD-METAL ALLOY AND THE PROCESS OF MAKING SAME

No Drawing. Original No. 1,549,615. dated August 11, 1925, Serial No. 672,014, filed October 31, 1923. Application for reissue filed July 22, 1929. Serial No. 380,249.

My invention relates to hard metal alloys or compositions. More particularly, it relates to alloyed tungstic carbide which alloy is suitable for making working implements of various sorts and which is particularly suitable for making hones.

The alloy of my invention differs from known alloys primarily by consisting of a tungstic carbide with a carbon content of from 3 to 10 per cent, in combination with an auxiliary metal of a considerably lower melting point as, for instance, iron, cobalt or nickel, in quantities up to a maximum of 10 per cent. A tungstic metal thus constitutes the predominating element amounting to at least 80 per cent of the total content of the alloy. The new alloy is not inferior in respect to hardness to the known tungstic carbide alloys and is quite considerably superior to these for strength.

To make the new alloys, it is advantageous to press into a body of pulverized tungstic carbide containing from 3 to 10 per cent carbon, together with an auxiliary metal in a finely divided state and in a quantity within the limits specified, and to heat this body to sintering temperature. The effect of the auxiliary metal is to reduce the sintering point of the body to such an extent that it occurs at temperatures which lie in the neighborhood of 1000 degrees below the melting point of the pure carbide. The foregoing method is considerably cheaper, easier and simpler than the methods used heretofore wherein a temperature of about 2500 degrees must be obtained.

Another object of my invention is that inasmuch as the body may be pressed and sintered in a manner well known, it is possible to make the body into any desired form such as is obtained only with great difficulty when other processes are used.

In making the new alloy, pulverized tungstic carbide can be used as the main material which can be produced by carburizing tungstic powder from the gas phase, or by mixing the tungstic powder with carbon. The carbon may be of soot, sugar carbon, graphite and the like. A carbon content of 7 per cent has proved especially favorable, but it can be varied from 3 to 10 per cent.

A metal which can be reduced by hydrogen and which has a considerably lower melting point than the tungstic carbide is suitable for use as the auxiliary metal, for example, iron, cobalt or nickel. These metals may be in a finely divided form. The temperature at which the sintering occurs is affected by the quantity of the admixed auxiliary metal, which can be made as high as 10 per cent of the alloy. For instance, an admixture of 5 per cent cobalt has proved particularly favorable in which case a very hard and exceedingly compact product is produced. Instead of using a single auxiliary metal as those named in the foregoing, two or several of the auxiliary metals may be added to the tungstic powder in which case the auxiliary metals can be taken in any suitable ratio to each other, but they must not, all told, make up more than 10 per cent of the total quantity of the alloy. The sintering of the bodies, which bodies are formed for instance into a compact mass by hydraulic pressure can be effected by heating them in a protective atmosphere such as an atmosphere of hydrogen, nitrogen, argon, illuminating gas, carbonic oxide, or an admixture of such gases, or the sintering can be effected by embedding the bodies in carbon, graphite and the like. Suitable sintering temperature may be found between 1500 and 1600 degrees C.

When the mixed powdered tungsten carbide and auxiliary metal are heated to the sintering temperature of the mixture, the auxiliary metal, which in the mixing operation has become uniformly distributed throughout the composition, acts to cement the minute tungsten carbide particles together. The binder thus formed in situ provides a substantially continuous matrix throughout the entire composition.

What I claim as new and desire to secure by Letters Patent of the United States, is:

1. A hard metal alloy comprising a carbide of tungsten, the carbon content of which ranges from 3 to 10% of the carbide, said alloy having, in addition, a metal of a considerably lower melting point than the carbide, said metal forming not more than 10% of the alloy.

2. A hard metal alloy comprising a carbide of tungsten, the carbon content of which ranges from 3 to 10% of the carbide, said alloy having a metal of the iron group, the latter forming not more than 10% of the alloy.

3. A hard metal alloy comprising a carbide of tungsten, the carbon content of which ranges from 3 to 10% of the carbide, said alloy having iron, the latter forming not more than 10% of the alloy.

4. The method of making an alloy of a carbide of tungsten and a metal which consists in bringing together a pulverized tungsten carbide and a quantity of finely divided metal having a considerably lower melting point than said carbide, mixing said materials and pressing them into forms and heating the forms to sintering temperature.

5. The method of making an alloy of a carbide of tungsten and a metal which consists in bringing together a pulverized tungsten carbide, said carbide having a carbon content within the ranges of from 3 to 10%, and a quantity of finely divided metal of the iron group, said metal not exceeding 10% of the alloy, mixing said materials and pressing them into forms and heating the forms to sintering temperature.

6. A hard metal alloy consisting of a mixture of tungsten carbide and a metal with a melting point considerably lower than that of the carbide, the proportions of the tungsten carbon and of the metal being respectively not less than 80% of tungsten, at least 2.7% but not more than 9.8% of carbon and an appreciable amount but not more than 10% of the metal.

7. A sintered hard metal composition comprising a carbide of tungsten and a metal of a considerably lower melting point than the carbide, said metal forming not more than 10% of the composition, the carbon in said composition varying from about 2.7% to about 9.8% of said composition.

8. A sintered hard metal composition comprising tungsten carbide and a metal of the iron group, the latter forming not more than 10% of the composition, the carbon in said composition varying from about 2.7% to about 9.8% of said composition.

9. A sintered hard metal composition consisting of tungsten carbide and a metal having a melting point considerably lower than that of the carbide, said composition containing not less than 80% of tungsten, at least 2.7% but not more than 9.8% of carbon and not more than 10% of said metal.

10. A sintered hard metal composition consisting substantially entirely of tungsten-carbide and metal of the iron group, said metal of the iron group forming an appreciable amount but not more than 10% of said composition, the carbon in said composition varying from about 2.7% to about 9.8% of said composition.

11. A compact, hard, metal composition consisting of a sintered mixture of pulverized tungsten carbide and a quantity of finely divided auxiliary metal from a group consisting of cobalt, iron and nickel, said auxiliary metal forming not more than 10% of said composition, and the carbon in said composition varying from about 2.7% to 9.8%.

12. A compact, hard, metal composition consisting mainly of minute tungsten carbide particles cemented together with metal whose chief constituent comes from a group consisting of cobalt, iron and nickel, said metal forming a substantially continuous matrix throughout said composition, said metal forming not more than 10% of said composition and the carbon in said composition varying from about 2.7% to about 9.8%.

13. A compact, strong, hard, metal composition consisting substantially of tungsten carbide particles and a binder, said binder formed in situ and having a lower melting point than said carbide, said binder forming not more than 10% of said composition and the carbon in said composition varying from about 2.7% to about 9.8%.

In witness whereof, I have hereunto set my hand this 21st day of June, 1929.

KARL SCHRÖTER.